No. 612,731. Patented Oct. 18, 1898.
O. J. JONES.
BOLT FOR THILL COUPLINGS.
(Application filed Dec. 13, 1897.)
(No Model.)
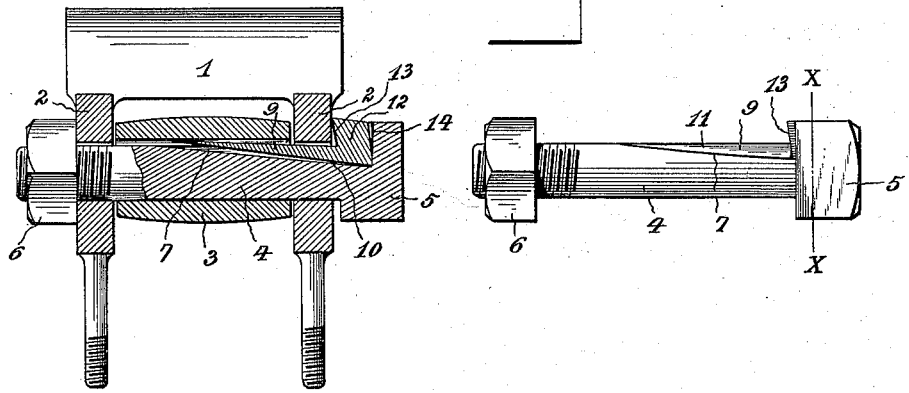
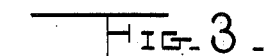 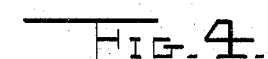
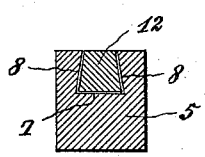 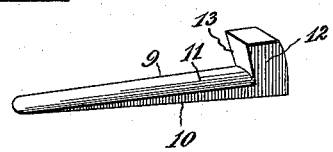
Inventor
Oscar J. Jones.
Witnesses
John F. Deufferwiel
Edwin Cruse
By his Attorneys,
C A Snow & Co.

UNITED STATES PATENT OFFICE.

OSCAR J. JONES, OF ALEXANDRIA, OHIO.

BOLT FOR THILL-COUPLINGS.

SPECIFICATION forming part of Letters Patent No. 612,731, dated October 18, 1898.

Application filed December 13, 1897. Serial No. 661,734. (No model.)

*To all whom it may concern:*

Be it known that I, OSCAR J. JONES, a citizen of the United States, residing at Alexandria, in the county of Licking and State of Ohio, have invented a new and useful Bolt for Couplings, of which the following is a specification.

This invention relates to bolts especially designed for use in thill-couplings, although they may be advantageously used in other relations where it is desirable to prevent lost movement between the parts; and the object of the invention is to provide a bolt with a spring seated in a recess in the bolt and adapted to be projected beyond the periphery of the stem of the bolt when the nut is tightened up on the bolt to clamp the latter in position.

With this object in view the invention consists of the several details of construction and arrangement of parts, as will be hereinafter fully described, and particularly pointed out in the claims.

In order to illustrate the application of my invention, I have in the accompanying drawings shown it in position on a bolt used in a thill-coupling, in which drawings—

Figure 1 is a sectional view of a thill-coupling, showing the bolt made in accordance with my invention also in section. Fig. 2 is an elevation of the bolt detached. Fig. 3 is a section on the line *x x* of Fig. 2. Fig. 4 is a perspective view of the spring detached.

Similar reference-numerals indicate similar parts in the several figures.

1 indicates an ordinary buggy-clip provided with jaws 2, between which the thill-iron 3 is inserted.

4 indicates the stem of the bolt, 5 its head, and 6 the clamping-nut.

A longitudinal groove 7 is formed in the stem and head of the bolt, and preferably the bottom wall of this groove will incline gradually inward from the surface of the stem toward the axial center of the bolt as it approaches the head thereof, as clearly shown in Fig. 1. The sides 8 of the groove in the head incline inwardly toward each other from bottom to top to form a substantially dovetail recess, for a purpose to be hereinafter referred to.

9 indicates a longitudinally-tapering spring having a flat lower face 10 to seat on the bottom of the groove and a rounded upper face 11 to correspond with the curvature of the stem 4. This spring is provided with a head 12, which is cross-sectionally dovetail in form to fit in the dovetail recess in the head of the bolt. The head of the spring can be inserted endwise into the recess, and the spring will thus be held from slipping out of the groove laterally. The front face 13 of the head of the spring inclines inwardly at its upper end and projects inwardly over the stem of the bolt beyond the head of the latter, and the rear face of the head of the spring and the opposing end wall of the dovetail recess in the head of the bolt are so arranged that a V-shaped space 14 is formed, and this may be done by inclining the wall outwardly toward its upper end or by beveling the end of the head, or both, as preferred. When the spring is in its normal position, the tapering portion thereof will lie in the groove in the stem of the bolt to be flush with the latter, and the front face of the head of the spring, at its upper end, will project over the stem of the bolt and lie beyond the plane of the inner face of the head of the bolt, as shown in Fig. 2. If now the nut be tightened up on the bolt, this projecting part of the head of the spring will be the first to engage the jaw 2, and as there is a V-shaped recess at the back of said head and said head abuts at its lower corner in the lower corner of the dovetail recess in the head of the bolt further tightening of the nut will rock the head and cause the wedge-shaped portion of the spring to rise in the groove 7 and be forced against the bore in the thill-iron, and the tighter the nut is turned up on the bolt the closer will be the engagement between the spring and thill-iron, and all rattling will thus be prevented.

It will thus be seen that I have provided in one article a thill-coupling bolt and an antirattler, and that the bolt can be easily clamped in position without necessitating the use of two wrenches, for as soon as the head and nut of the bolt begin to bind against the jaws 2 the spring will be forced into contact with the thill-iron and prevent the bolt from turning therein.

It will be understood that changes in the form, proportion, and the minor details of construction may be resorted to without departing from the spirit or sacrificing any of the advantages of this invention.

Having thus described the invention, what I claim is—

1. A bolt provided with a longitudinally-extending groove in its stem and head, combined with a spring seated in the groove in the stem and having a head to seat in the groove in the head of the bolt with a V-shaped space between their opposing end faces, whereby the head of the spring may be rocked in its seat to lift the spring in the groove in the stem, substantially as described.

2. A bolt provided with a longitudinally-extending groove in its stem and head, the bottom of said groove inclining downwardly from the end of the groove in the stem to the end of the groove in the head, the groove in the head being of dovetail form cross-sectionally, combined with a longitudinally-tapered spring seated in the groove in the stem and having a cross-sectionally dovetail head to seat in the groove in the head of the bolt, with a V-shaped space between their opposing end faces, whereby the head of the spring may be rocked in its seat to lift the spring in the groove in the stem, and the spring will be held against lateral displacement in the groove, substantially as described.

3. In a thill-coupling, the combination with the jaws and the thill-iron seated between them, of the bolt extending through the jaws and thill-iron, said bolt having a longitudinally-extending groove in its stem and head, a spring seated in the groove in the stem and having a head to seat in the groove in the head of the bolt with a V-shaped space between their opposing end faces, the front face of the head of the spring projecting at its upper end beyond the plane of the inner face of the head, whereby when the nut is tightened on the bolt the head of the spring will be rocked in its seat and lift the spring in the groove in the stem into contact with the thill-iron, substantially as described.

In testimony that I claim the foregoing as my own I have hereto affixed my signature in the presence of two witnesses.

OSCAR J. JONES.

Witnesses:
ROY LADD,
JAMES R. LADD.